(12) United States Patent
Bailey et al.

(10) Patent No.: US 8,458,124 B2
(45) Date of Patent: *Jun. 4, 2013

(54) AUTOMATIC ENFORCEMENT OF RELATIONSHIPS IN A DATABASE SCHEMA

(75) Inventors: Stuart Bailey, Mountain View, CA (US); Srinath Gutti, Fremont, CA (US); Ivan Pulleyn, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,036

(22) Filed: Dec. 9, 2011

(65) Prior Publication Data

US 2012/0150914 A1      Jun. 14, 2012

Related U.S. Application Data

(63) Continuation of application No. 10/950,364, filed on Sep. 24, 2004, now Pat. No. 8,095,501.

(60) Provisional application No. 60/591,821, filed on Jul. 27, 2004.

(51) Int. Cl.
*G06F 7/00* (2006.01)

(52) U.S. Cl.
USPC ........... 707/609; 707/802; 709/239; 709/240; 709/241; 709/242; 709/243; 709/244

(58) Field of Classification Search
None
See application file for complete search history.

(56) References Cited

U.S. PATENT DOCUMENTS

| | | | |
|---|---|---|---|
| 5,295,256 A * | 3/1994 | Bapat | 717/137 |
| 6,449,657 B2 * | 9/2002 | Stanbach et al. | 709/245 |
| 6,631,519 B1 * | 10/2003 | Nicholson et al. | 717/169 |
| 7,290,003 B1 | 10/2007 | Tong | |
| 7,343,377 B1 | 3/2008 | van Opdorp | |
| 7,623,547 B2 | 11/2009 | Dooley et al. | |
| 2004/0088571 A1 * | 5/2004 | Jerrim et al. | 713/201 |

* cited by examiner

*Primary Examiner* — Fred I Ehichioya
*Assistant Examiner* — Hasanul Mobin
(74) *Attorney, Agent, or Firm* — Van Pelt, Yi & James LLP (57) ABSTRACT

A technique for enforcing a database relationship is disclosed. The technique includes specifying within a database schema a reference type that associates two structures and specifies the relationship between the two structures, and automatically generating code that checks the relationship between the two structures based on the specified reference in the database schema.

21 Claims, 8 Drawing Sheets

AUTOMATIC ENFORCEMENT OF RELATIONSHIPS IN A DATABASE SCHEMA

CROSS REFERENCE TO OTHER APPLICATIONS

This application is a continuation of co-pending U.S. patent application Ser. No. 10/950,364, entitled AUTOMATIC ENFORCEMENT OF RELATIONSHIPS IN A DATABASE SCHEMA filed Sep. 24, 2004 which is incorporated herein by reference for all purposes, which claims priority to U.S. Provisional Application No. 60/591,821, entitled SET BASED DATA STORE filed Jul. 27, 2004 which is incorporated herein by reference for all purposes.

FIELD OF THE INVENTION

The present invention relates generally to data storage. More specifically, a markup language specification of a database schema is disclosed.

BACKGROUND OF THE INVENTION

Databases may be organized in a particular schema, such as an object oriented or a relational schema, each of which is specific to a database language. Routines to access and manage the data are implemented in a specific database language, which requires intricate knowledge of the language. Further, existing schemas typically do not provide a straightforward way to handle relationships between various objects in the database. Logical data consistency of these relationships is maintained by implementing database language specific routines, which is time consuming and prone to error. A more robust method of implementing a database schema is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating a database schema is disclosed. The database schema is specified in a markup language and translated into an in memory representation. Specific database language code is generated from the in memory representation. Database relationships may be enforced by specifying within a database schema a reference type that associates two structures and specifies the relationship between the two structures, and automatically generating code that checks the relationship between the two structures.

Figure 1:
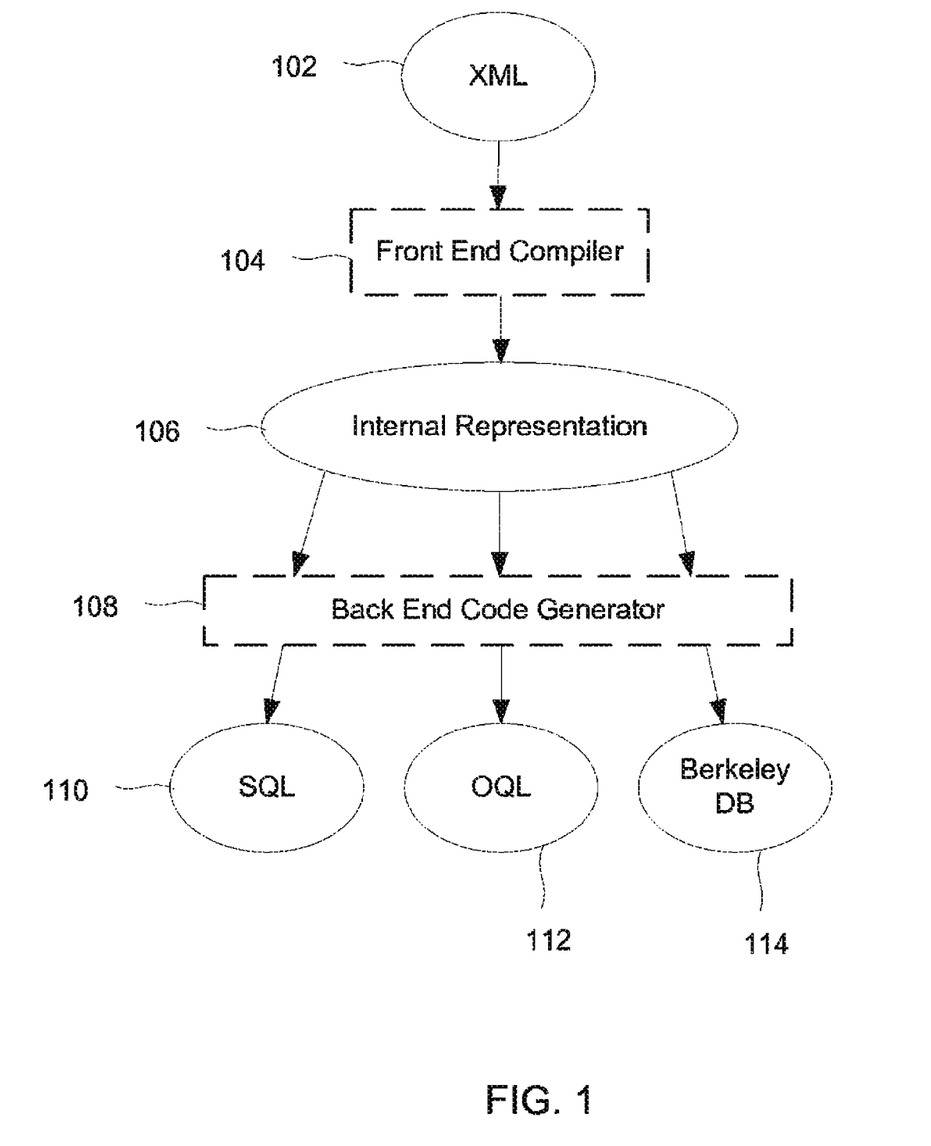
FIG. 1 is a block diagram illustrating how a markup language representation of a database is transformed into a specific database schema.

FIG. 1 is a block diagram illustrating how a markup language representation of a database is transformed into a specific database schema. In this example, a markup language based on Extensible Markup Language (XML) specifies a database schema. This markup language is referred to as Runtime XML (RTXML). RTXML specifies the objects in the database and the logical relationships between objects in the database. RTXML also provides mechanisms to check values in the database for consistency. Using RTXML to specify the database schema provides a layer of abstraction from the target database language, which can greatly simplify development time and effort. In this example, XML 102 is processed by a front end compiler 104 into an internal representation 106. For example, the XML structures may be represented by compiled C code. A backend code generator 108 processes internal representation 106 and generates a database language specific representation of the structures. For example, Structured Query Language (SQL) 110, Object Query Language (OQL) 112, or Berkeley DB 114 (e.g., a version made by Sleepycat Software) are examples of some of the database schema that may be generated. In some embodiments, backend code generator 108 includes a separate code generator for each database language that may be desired.

The following is an example of RTXML code (Example 1):

```
<package name=".com.infoblox.dns">
    <structure name="host">
        <member name="zone" type=".com.infoblox.dns.zone"
        ref-type="deep" key-type="key">
            <syntax string_length="64"/>
        </member>
        <member name="host_name" type="rtxml.string" key-type="key">
            <syntax string_length="64"/>
        </member>
        <member name="ip_address" type="rtxml.string">
            <syntax "ip_address"/>
```

```
        </member>
    </structure>
    <function name="insert_host">
        <argument name="zone"/>
        <argument name="host_name"/>
        <argument name="ip_address"/>
        <return name="host" query="INSERT INTO host (zone, host_name,
ip_address) values ('${zone}','${host_name}','${ip_address}')">
        </return>
    </function>
</package>
```

In this example, one structure and one function are specified within a package ".com.infoblox.dns". Structure is an example of a tag defined in RTXML. The structure has a name "host" and is a host structure. The host structure includes three members: a zone, a host_name, and an ip_address. The zone member includes three attributes: a type, a ref-type, and a key-type. The existence of the ref-type attribute indicates that the structure refers to another structure of type indicated by the type attribute. In this case, the type is ".com.infoblox.dns.zone", so the host structure refers to a zone structure (not shown) defined in the package .com.infoblox.dns.

The ref-type attribute, in this case "deep", indicates the type of relationship between this structure and a parent structure (the structure to which this structure refers) or child structures (structures referring to this structure). A ref-type of "deep" indicates that if the parent structure does not exist, the structure cannot exist. In this case, the host structure cannot exist unless the parent zone structure exists. A ref-type of "shallow" indicates that it is not necessary for a parent or a child of the structure to exist. A ref-type of "pinned" indicates that the structure cannot be deleted if there is a child structure referring to it. A key-type of "key" indicates that the member is part of the key for that structure. The key is a unique identifier of the structure. In some embodiments, the key is a concatenation of the values of all members tagged as keys. In this case, members host_name and zone are tagged as keys. If the host_name is "mail" and the zone is "infoblox.com", the key would be "mail.infoblox.com". A syntax tag is also shown within the zone member, indicating that member zone must follow the specified syntax rule (in this case, the zone value is of maximum length 64). Similarly, members host_name and ip_address have various attributes to describe their characteristics. Any number of other structures may also be defined.

The function has a name "insert_host" and includes three arguments: "zone", "host_name", and "ip_address". The "return" tag indicates the function to be generated. For example, if this code were part of XML 102 from FIG. 1, SQL 110 would include the SQL table of the host structure and an SQL function ("insert_host(zone, host_name, ip_address") that is provided, for example, as part of a supplemental library.

Any other function can be represented in RTXML. For example, database functions, such as update, insert, delete, and select, can similarly be defined in RTXML.

Figure 2:
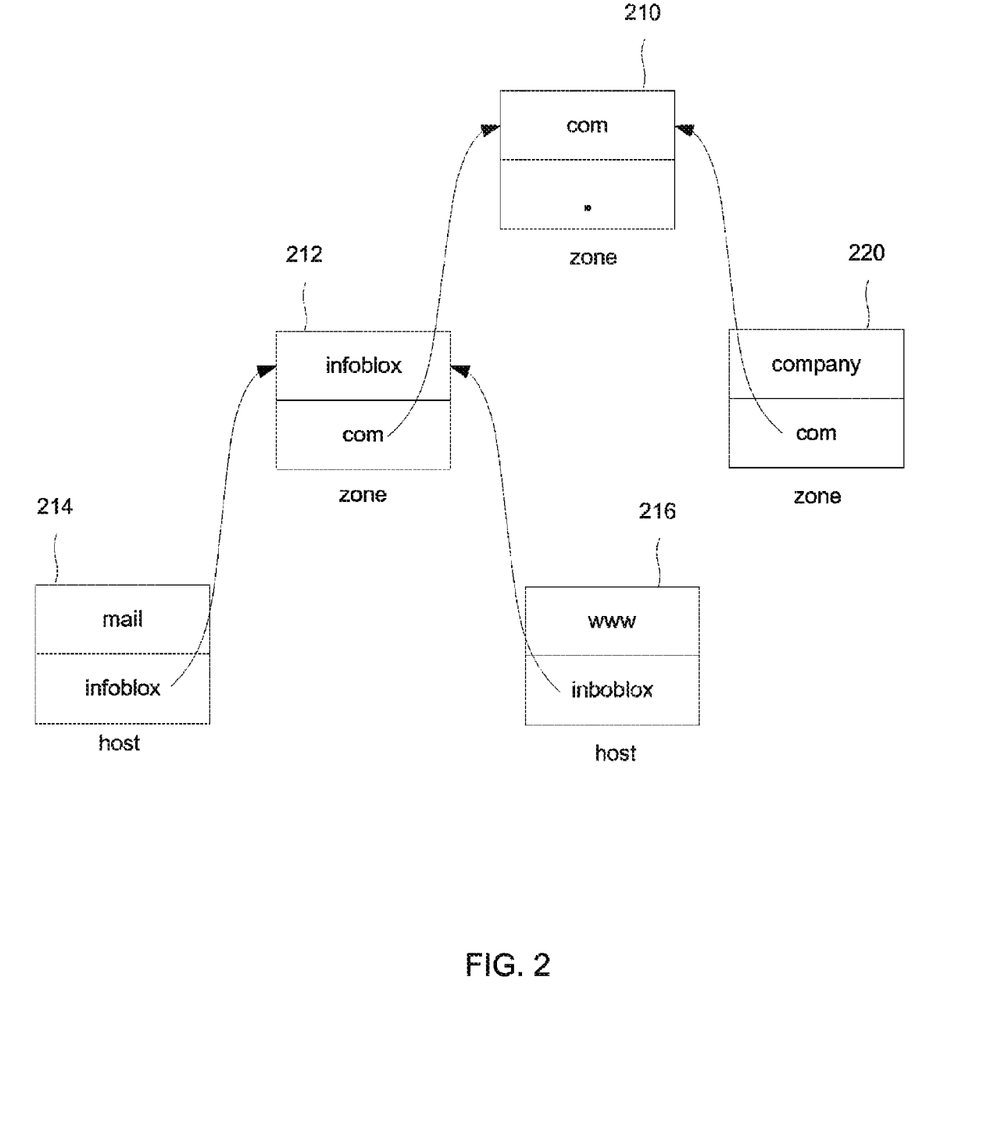
FIG. 2 is a diagram illustrating the relationships between various structures that can be defined using ref-types.

FIG. 2 is a diagram illustrating the relationships between various structures that can be defined using ref-types. In this example, each node 210-220 represents a structure. Three zone structures 210, 212, and 220 and two host structures 214 and 216 are shown. Each node representing a host structure shows the host_name and type. For example, host structure 214 has host_name "mail" and type "infoblox". The type indicates the referenced structure, or parent structure. In the case of host structure 214, the parent structure is zone structure 212 with zone_name "infoblox". Similarly, zone structure 212 has type "com", indicating that zone structure 212 references zone structure 210 with zone_name "com". Zone structure 210 has type ".", indicating that there is no zone above zone 210. A structure can thus refer to a structure of the same type, as shown by the zone structure in this example. Also shown are the parent and child relationships that can exist between structures. In this case, zone 210 is the parent of zone 212 and zone 220, zone 212 is the parent of host 214 and host 216, host 214 and host 216 are children of zone 212, and zone 212, and zone 220 are children of zone 210.

Figure 3:
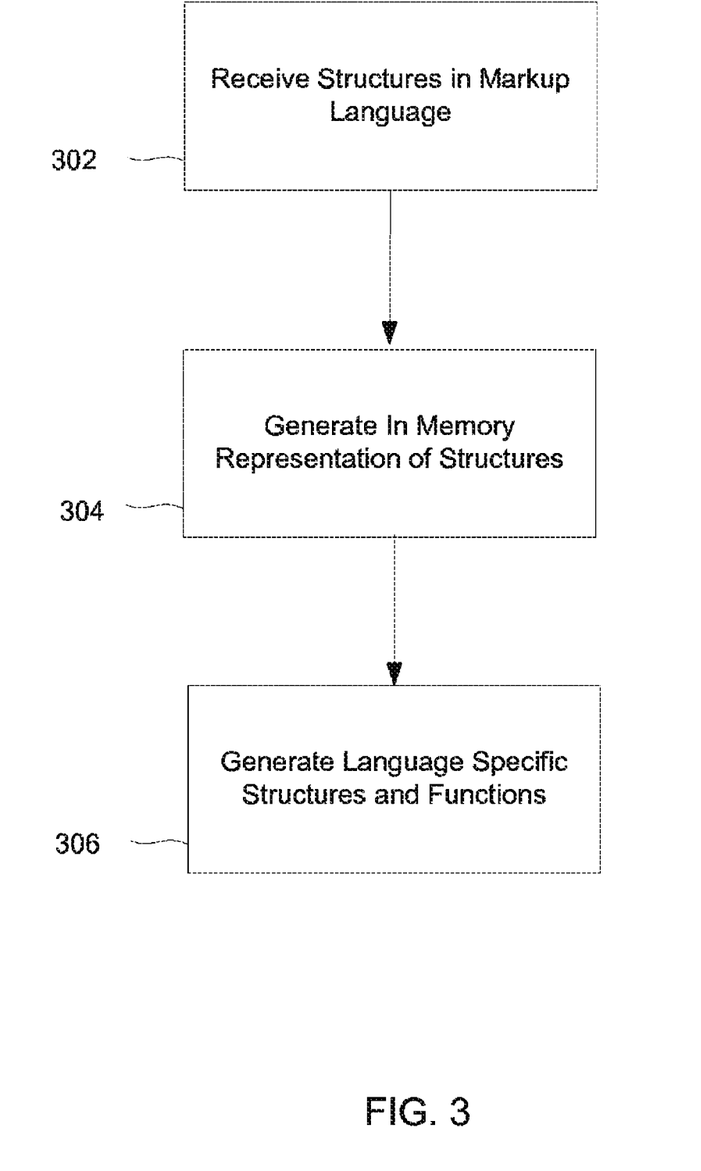
FIG. 3 is a flowchart illustrating a method of generating a database schema from a markup language representation of the database.

FIG. 3 is a flowchart illustrating a method of generating a database schema from a markup language representation of the database. In this example, structures in a markup language are received (302). For example, a markup language such as RTXML is specified where the specification includes various structures and functions. (e.g., XML 102 in FIG. 1). An in memory representation of the structures is generated (304). (e.g., internal representation 106 in FIG. 1) For example, a front end compiler may generate the in memory representation, as more fully described below. Language specific structures and functions are generated (306). (e.g., specific database blocks 110-114) For example, a back end code generator may take the in memory representation of the structures and generate the equivalent database language specific code, such as SQL code, as more fully described below. The functions may be provided as part of a library to the developer, for example.

Figure 4:
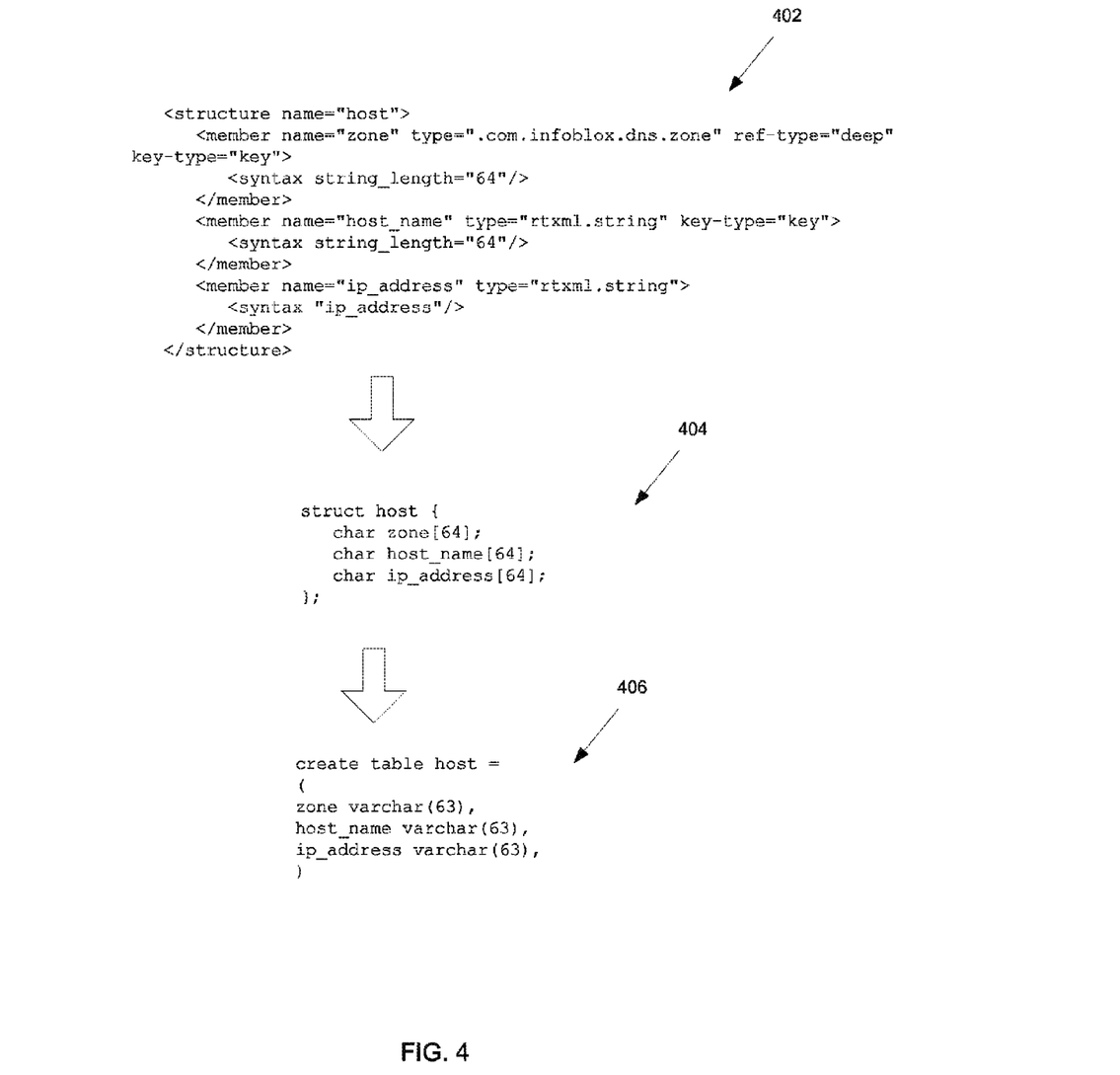
FIG. 4 is a diagram illustrating an example of generating an SQL table from an RTXML representation of the table.

FIG. 4 is a diagram illustrating an example of generating an SQL table from an RTXML representation of the table. In this example, the first portion of RTXML code from Example 1 (RTXML 402) is shown. From RTXML 402 an in memory representation is generated, as described in step 304. In some embodiments, the in memory representation of the structures is represented by compiled C code 404. For example, a structure in RTXML would be equivalent to a structure in C. There are many other ways in which in memory structures can be stored, such as in a hash table, for example. For simplicity, additional code that may also be included is not shown in this example. For example, code representing the ref-type and key information is not shown. Compiled C code 404 is used to generate an SQL representation of the host structure 406, as described in step 306. For example, a structure in C would be equivalent to a table in SQL. Alternatively, to generate an OQL database, assuming the equivalent to an RTXML structure in OQL is a field, code to create an OQL field would be shown instead of code 406. Similarly, in the case of a Berkeley DB database, the appropriate Berkeley DB syntax would be generated to insert the in memory structure and its associated key into a Berkeley DB database.

An RTXML function, such as "insert_host" shown in FIG. 2, would be similarly stored as an in memory structure and then converted to a specific database language, such as SQL. In some embodiments, certain functions are implicit in a structure definition. For example, for each structure, insert, delete, update, and select functions may be generated automatically.

Figure 5:
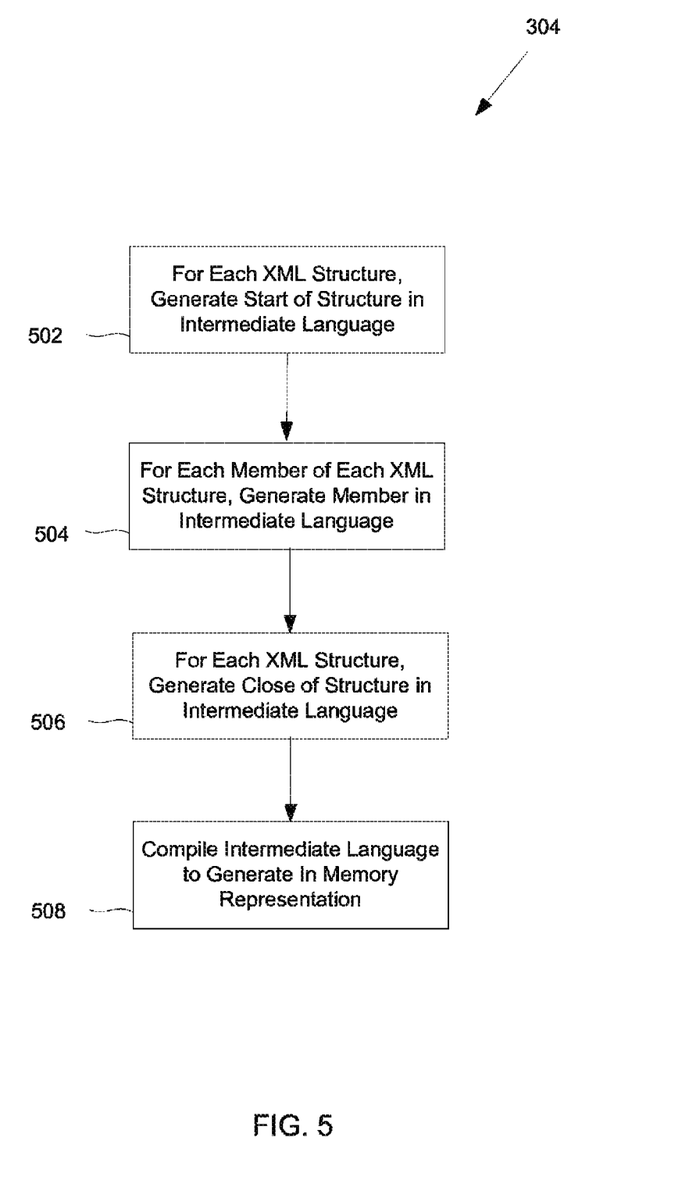
FIG. 5 is a flowchart illustrating a method of generating an in memory representation of an RTXML structure.

FIG. 5 is a flowchart illustrating a method of generating an in memory representation of an RTXML structure. In some embodiments, this process can be used to perform step 304 from FIG. 3. In this example, an XML file is parsed. For each XML structure, the start of a structure is generated in an intermediate language (502), such as C or Java. For example, assuming RTXML 402 is being parsed, the following code would be generated in C:

struct host {

For each member of each XML structure, the member is generated in the intermediate language (504). For example, assuming RTXML 402 is being parsed, the following code would be generated in C:

```
char zone[64];
char host_name[64];
char ip_address[64];
```

For each XML structure, a close of structure is generated in the intermediate language (506). For example, assuming RTXML 402 is being parsed, "};" would be generated in C:

As such, C code 404 would be generated by this process. The intermediate language is compiled to generate an in memory representation (508). In this example, a C compiler could be used to generate the in memory representation of the host structure.

Figure 6:
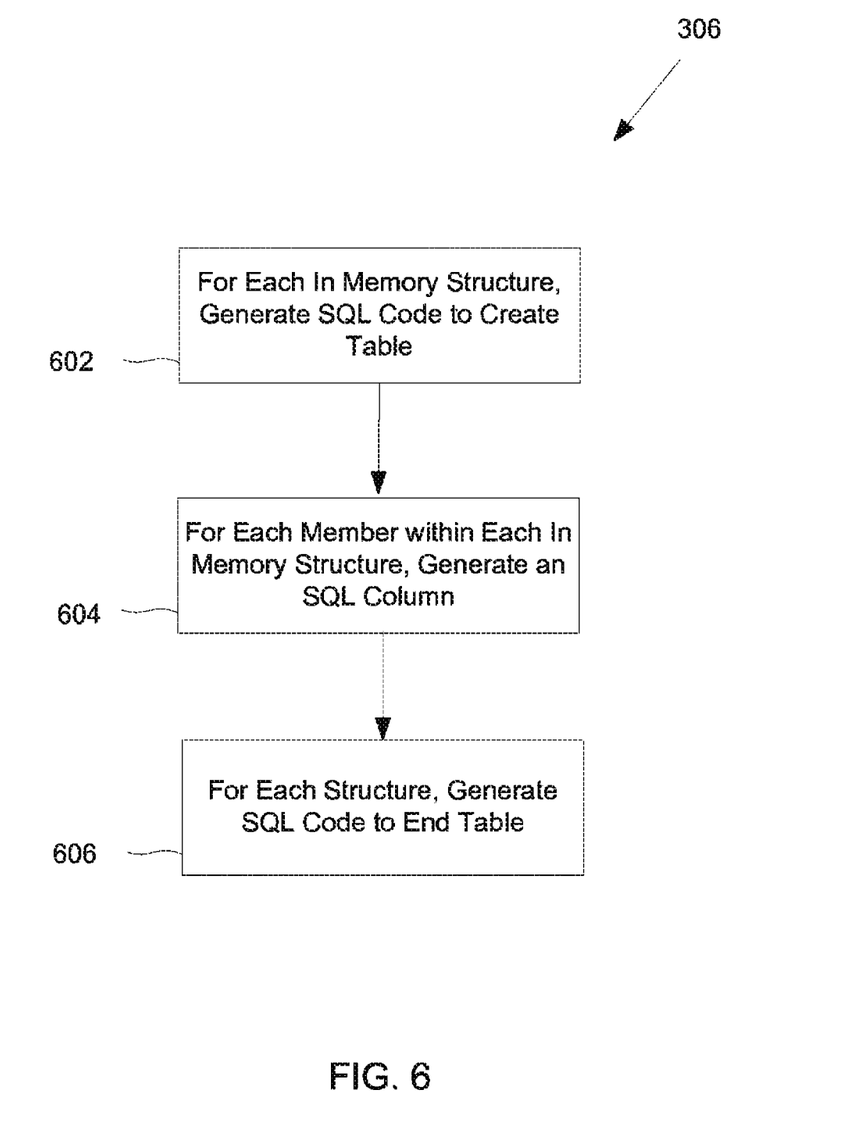
FIG. 6 is a flowchart illustrating a method of generating an SQL table from an in memory representation of a structure.

FIG. 6 is a flowchart illustrating a method of generating an SQL table from an in memory representation of a structure. In some embodiments, this process can be used to perform step 306 from FIG. 3. In this example, in memory structures are parsed. For each in memory structure, SQL code is generated to create a table. For example, assuming the in memory representation of code 404 is being parsed, the following code would be generated in SQL to indicate the beginning of a table creation:

```
create table host =
(
```

For each member within each in memory structure, an SQL column is generated. For example, assuming the in memory representation of code 404 is being parsed, the following code would be generated in SQL:

```
zone varchar(63),
host_name varchar(63),
ip_address varchar(63),
```

For each structure, SQL code closing the table is generated (606). For example, assuming the in memory representation of code 404 is being parsed, ")" would be generated in SQL to indicate the end of the table creation.

As such, the SQL code 406 would be generated by this process. For simplicity, additional code that may also be included is not shown in this example. For example, code representing the ref-type and key information is not shown.

Figure 7:
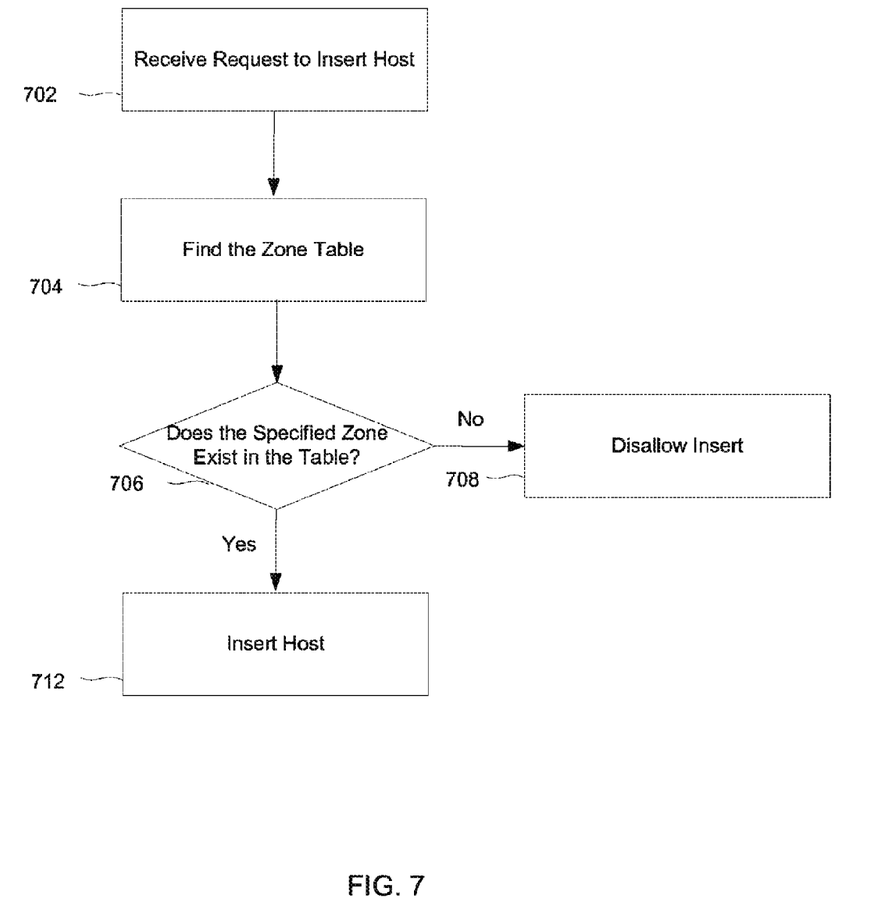
FIG. 7 is a flowchart illustrating a method of enforcing a reference during an insert.

FIG. 7 is a flowchart illustrating a method of enforcing a reference during an insert. For example, a host is of ref-type "deep", so logic must be provided to ensure that a host is not inserted unless it has a parent. This logic would execute each time a request to insert a host (or add a host) is received. A request to insert a host is received (702). For example, a user may enter in SQL (or another target database language) the following:

insert_host("infoblox.com", "mail", "10.0.0.1")

The zone structure (i.e., table, in the case of SQL) that is being referenced is found (704). It is determined whether the specified zone exists in the structure. In the above example, it is determined whether the specified zone "infoblox.com" exists. If the specified zone does not exist, the insert is disallowed (708). If it is determined that the specified zone does exist, the host is inserted (712).

Figure 8:
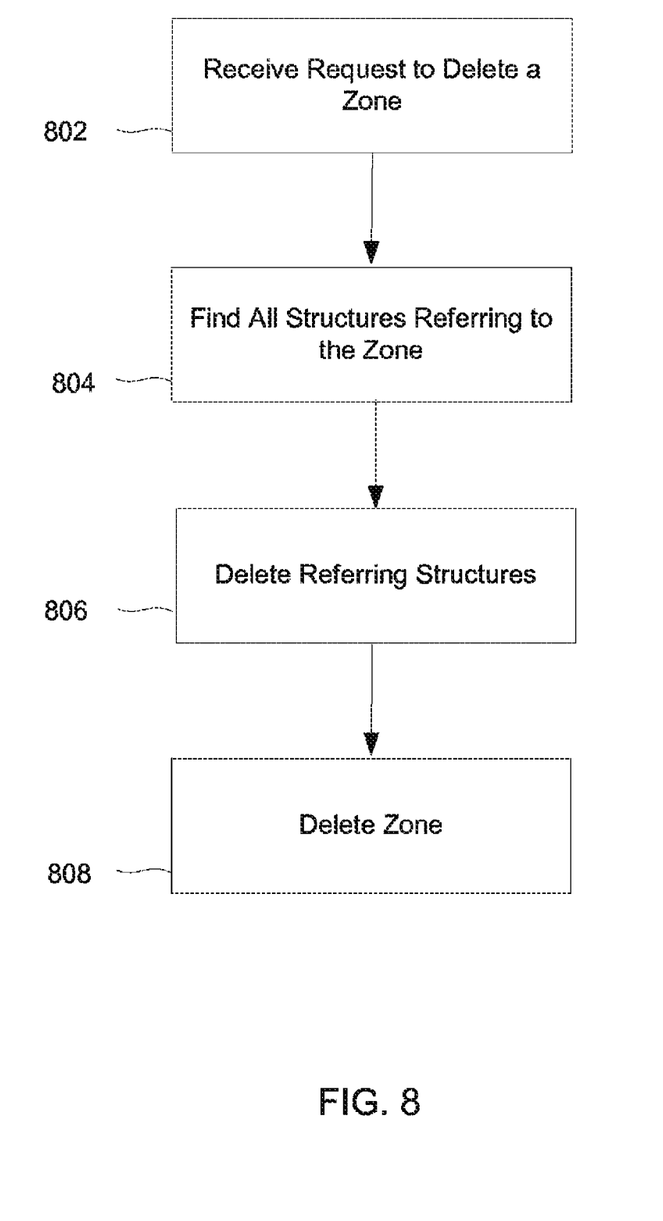
FIG. 8 is a flowchart illustrating a method of enforcing a reference during a delete.

FIG. 8 is a flowchart illustrating a method of enforcing a reference during a delete. For example, other structures such as host have a ref-type "deep" to zone, so logic must be provided to ensure that when a zone is deleted, structures referring to the zone are deleted to maintain logical database consistency. This logic would execute each time a request to delete a zone is received. A request to delete a zone is received (702). For example, a user may enter in SQL (or another target database language) the following:

delete_zone("infoblox.com")

All structures referring to the zone are found (804). For example, "mail.infoblox.com" and "www.infoblox.com" may be found in the above example. The referring structures are deleted (806). i.e., "mail.infoblox.com" and "www.infoblox.com" would be deleted in the above example. Other types of structures may also be found and deleted. For example, if the zone to be deleted were ".com", zone structure "infoblox.com" would also be found and deleted. The zone is deleted (808).

In some embodiments, not all referring structures are deleted. For example, if a referring structure has ref-type "shallow", there is no requirement for a parent of a child to exist. As such, any structure referring to the structure to be deleted would have its reference removed (e.g., nullified).

In some embodiments, it is not possible to delete all referring structures. For example, if a referring structure has ref-type "pinned", the structure may not be deleted if there is a child structure referring to it. As such, the attempt to delete would be disallowed.

In some embodiments, the logic described in FIGS. 7 and 8 is generated in step 306 by a backend code generator. In one embodiment, the logic is integrated in functions provided in a supplemental library in step 306 from FIG. 3. For example, the logic described in FIG. 7 would be provided in the "insert_host" function. The logic described in FIG. 8 would be provided in the "delete_zone" function. In other embodiments, the logic is provided implicitly by the target database language. For example, some target database languages may provide a way to specify and enforce these relationships.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of enforcing a database relationship, comprising:
    specifying using a markup language within a database schema a host structure and a reference type for the host structure that indicates an association between the host structure and a parent structure to which the host structure refers and specifies the relationship between the host structure and the parent structure, wherein the reference type is specified using the markup language and selected from at least a first reference type, a second reference type, and a third reference type;
    automatically generating code that enforces the relationship between the host structure and the parent structure based on the reference type specified in the database schema;
    enforcing the relationship using the automatically generated code, including determining whether the reference type for the host structure is of the first reference type, the second reference type, or the third reference type;

in the event that the reference type for the host structure is of the first reference type and a request to delete a host in a database for which the database schema has been defined is received,
disallowing deletion of the host if the host refers to a child instance, and
allowing deletion of the host if the host does not refer to a child instance;
in the event that the reference type for the host structure is of the second reference type and a request to delete a host in a database for which the database schema has been defined is received, deleting an instance referring to the host; and
in the event that the reference type for the host structure is of the third reference type and a request to delete a host in a database for which the database schema has been defined is received, nullifying a reference of an instance referring to the host.

2. The method as recite in claim 1, wherein in the event the reference type for the host structure is of the first reference type, ensuring that an instance of the parent structure cannot be deleted when an instance of the host structure exists.

3. The method as recite in claim 1, wherein in the event the reference type for the host structure is of the second reference type, ensuring that when an instance of the parent structure does not exist, an instance of the host structure cannot exist.

4. The method as recite in claim 1, wherein in the event the reference type for the host structure is of the second reference type:
receiving a request to insert a host into a database for which the database schema has been defined, wherein the host is an instance of the child structure and the host refers to an instance of a parent structure; and
determining whether the instance of the parent structure exists in the database, wherein the instance of the parent structure is a Domain Name System (DNS) zone of a network.

5. The method as recite in claim 4, wherein in the event that the instance of the parent structure does not exist in the database, disallowing insertion of the instance of the child structure into the database, wherein the insert of the host is disallowed if the DNS zone does not exist.

6. The method as recited in claim 1, wherein if the third reference type is selected, it is not necessary for the parent structure to exist for the host structure to exist; and it is not necessary for a child structure of the host structure to exist for the host structure to exist.

7. The method as recited in claim 1, wherein the code includes a function that checks the relationship between the two structures.

8. The method as recited in claim 1, wherein the code is SQL code.

9. The method as recited in claim 1, wherein the code is associated with a relational database.

10. The method as recited in claim 1, wherein the code is associated with an object oriented database.

11. The method as recited in claim 1, wherein generating includes:
translating the markup language specification into an in memory representation; and
generating the code from the in memory representation in a specific database language.

12. The method as recited in claim 11, wherein the markup language is based on XML.

13. The method as recited in claim 11, wherein translating includes compiling a structure in an intermediate language.

14. The method as recited in claim 11, wherein the database language is associated with a relational database.

15. The method as recited in claim 11, wherein the database language is associated with an object oriented database.

16. The method as recited in claim 11, wherein the generated code includes a function.

17. The method as recited in claim 11, wherein the structure includes a reference that indicates a parent of the structure.

18. The method as recited in claim 11, wherein the structure includes a key that uniquely identifies the structure.

19. The method as recited in claim 1, wherein the request to insert the host into the database includes a zone name for the zone, a host name for the host, and an IP address for the host.

20. A system for enforcing a database relationship, comprising:
a processor configured to:
specify using a markup language within a database schema a host structure and a reference type for the host structure that indicates an association between the host structure and a parent structure to which the host structure refers and specifies the relationship between the host structure and the parent structure, wherein the reference type is specified using the markup language and selected from at least a first reference type, a second reference type, and a third reference type;
automatically generate code that enforces the relationship between the host structure and the parent structure based on the reference type specified in the database schema;
enforce the relationship using the automatically generated code, including determining whether the reference type for the host structure is of the first reference type, the second reference type, or the third reference type;
in the event that the reference type for the host structure is of the first reference type and a request to delete a host in a database for which the database schema has been defined is received,
disallow deletion of the host if the host refers to a child instance, and
allow deletion of the host if the host does not refer to a child instance;
in the event that the reference type for the host structure is of the second reference type and a request to delete a host in a database for which the database schema has been defined is received, delete an instance referring to the host; and
in the event that the reference type for the host structure is of the third reference type and a request to delete a host in a database for which the database schema has been defined is received, nullify a reference of an instance referring to the host; and
a memory that is coupled with the processor, wherein the memory provides the processor with instructions.

21. A computer program product for enforcing a database relationship, the computer program product being embodied in a non-transitory computer readable storage medium and comprising computer instructions executable to:
specifying using a markup language within a database schema a host structure and a reference type for the host structure that indicates an association between the host structure and a parent structure to which the host structure refers and specifies the relationship between the host structure and the parent structure, wherein the reference type is specified using the markup language and selected from at least a first reference type, a second reference type, and a third reference type;

automatically generating code that enforces the relationship between the host structure and the parent structure based on the reference type specified in the database schema;

enforcing the relationship using the automatically generated code, including determining whether the reference type for the host structure is of the first reference type, the second reference type, or the third reference type;

in the event that the reference type for the host structure is of the first reference type and a request to delete a host in a database for which the database schema has been defined is received,
- disallowing deletion of the host if the host refers to a child instance, and
- allowing deletion of the host if the host does not refer to a child instance;

in the event that the reference type for the host structure is of the second reference type and a request to delete a host in a database for which the database schema has been defined is received, deleting an instance referring to the host; and in the event that the reference type for the host structure is of the third reference type and a request to delete a host in a database for which the database schema has been defined is received, nullifying a reference of an instance referring to the host.

* * * * *

UNITED STATES PATENT AND TRADEMARK OFFICE
CERTIFICATE OF CORRECTION

PATENT NO. : 8,458,124 B2
APPLICATION NO. : 13/316036
DATED : June 4, 2013
INVENTOR(S) : Bailey et al.

It is certified that error appears in the above-identified patent and that said Letters Patent is hereby corrected as shown below:

In the drawings, sheet 2 of 8, Fig. 2 should be deleted and substitute therefore the attached page, sheet 2 of 8 consisting of Fig 2.

Signed and Sealed this
Twenty-second Day of October, 2013

Teresa Stanek Rea
*Deputy Director of the United States Patent and Trademark Office*

FIG. 2